(12) United States Patent
Tabuchi

(10) Patent No.: US 7,440,124 B2
(45) Date of Patent: Oct. 21, 2008

(54) INK-JET PRINTER PURGING DEVICE SHARED BY MULTIPLE HOST MACHINES

(75) Inventor: Kazumi Tabuchi, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1062 days.

(21) Appl. No.: 09/843,875

(22) Filed: Apr. 30, 2001

(65) Prior Publication Data

US 2001/0043249 A1 Nov. 22, 2001

(30) Foreign Application Priority Data

May 22, 2000 (JP) ............................. 2000-149977

(51) Int. Cl.
*G06K 1/00* (2006.01)
*B41J 2/165* (2006.01)
(52) U.S. Cl. ........................ 358/1.14; 358/1.15; 347/30; 347/33
(58) Field of Classification Search ................. 358/1.1, 358/1.9, 1.11–1.18; 347/22, 23, 30, 33
See application file for complete search history.

(56) References Cited

U.S. PATENT DOCUMENTS 5,475,404 A * 12/1995 Takahashi et al. ............. 347/23
5,847,726 A * 12/1998 Hori ............................. 347/23
6,078,400 A * 6/2000 Mizutani ..................... 358/1.14
6,388,758 B2 * 5/2002 Kawanabe et al. ......... 358/1.13
6,398,336 B1 * 6/2002 Yoda et al. .................... 347/23

FOREIGN PATENT DOCUMENTS

| JP | 79686 | | 1/1995 |
| JP | 09058014 A | * | 3/1997 |
| JP | 2000076035 A | * | 3/2000 |

\* cited by examiner

*Primary Examiner*—Edward L. Coles
*Assistant Examiner*—Thierry L Pham
(74) *Attorney, Agent, or Firm*—Birch, Stewart, Kolasch & Birch, LLP

(57) ABSTRACT

An ink-jet printer system includes an ink-jet printer and a multiple number of host machines. The ink-jet printer has a storage portion for holding the completion time of the last printing operation while each host machine has a controller having an inactive time computing portion which computes the inactive time of printing operation of the ink-jet printer. This is done by comparing the completion time of the last printing operation held in the storage portion with the current time when a printing operation starts and a recovery treatment controller for controlling the execution of a recovery treatment of the ink-jet printer in accordance with the inactive time of ink-jet printer.

13 Claims, 5 Drawing Sheets

INK-JET PRINTER PURGING DEVICE SHARED BY MULTIPLE HOST MACHINES

BACKGROUND OF THE INVENTION (1) Field of the Invention

The present invention relates to an ink-jet printer system in which a common ink-jet printer is shared by a multiple number of host machines.

(2) Description of the Prior Art

In general, if an ink-jet printer has been unused for a long period, the viscosity of ink increases due to ink drying at the nozzle portion of the ink head, inducing failure to eject ink and nozzle clogging. Therefore, a necessary recovery treatment such as cleaning of the ink-jet head is needed before a printing operation after a lapse of a long period of inactivity of the printer.

If, however, this recovery treatment is performed each time a printing operation is started or at other timings regardless of the duration of the inactive time, an unnecessary recovery treatment may be done despite that the inactive time is short. In such an event not only is the completion time of the printing operation delayed by the execution of unnecessary recovery treatment, but also the ink and electric energy used for the recovery treatment are consumed wastefully.

In order to solve this problem, Japanese Patent Application Laid-Open Hei 7 No. 009686 discloses a technology in which output of warning information and a necessary recovery treatment are performed in accordance with the inactive time of the ink-jet printer so as to suppress the time required for the recovery treatment and the consumption of ink. The technology of this publication, however, is proposed assuming a system for an electronic device including a dedicated printer, that is, a system which is made up of a single electronic device and a single ink-jet printer.

With the recent prevalence of personal computers and development of networking, there is an increasing tendency toward use of systems in which a single ink-jet printer is shared by a multiple number of host machines(personal computers, electronic devices and the like). In such a system, it is possible for each host machine to memorize when the ink-jet printer was used but it is impossible to know the usage status of the ink-jet printer from other host machines. Therefore, when a single ink-jet printer is shared by multiple host machines, it has been difficult for each host machine to precisely determine the inactivity time of the ink-jet printer.

SUMMARY OF THE INVENTION

The present invention has been devised in view of the above circumstances, it is therefore an object of the present invention to provide an ink-jet printer system wherein, even when a single ink-jet printer is shared by a multiple number of host machines, the inactivity time of the ink-jet printer can be correctly known so as to perform necessary recovery treatments in the ink-jet printer at suitable timings, whereby it is possible to reduce the operating time and ink consumption.

The means for achieving the above object, the present invention is configured as follows:

In accordance with the first aspect of the present invention, an ink-jet printer system wherein a common ink-jet printer is shared by a multiple number of host machines is characterized in that the ink-jet printer is provided with a storage means which updates and stores the completion time of the last printing operation and each host machine is provided with a print control means which reads out the completion time from the ink-jet printer at the start of a printing operation, compares it with the current time and selectively issues an execution order of a recovery treatment to the ink-jet printer based on the result of the comparison.

In accordance with the second aspect of the present invention, the ink-jet printer having the above first feature is characterized in that the print control means includes a time measuring means for measuring the current time and transfers the current time measured by the time measuring means at the end of a printing operation to the ink-jet printer as the completion time of the printing operation.

In accordance with the third aspect of the present invention, the ink-jet printer having the above first feature is characterized in that the print control means determines whether or not the completion time of the last printing operation read out from the ink-jet printer is valid and gives an execution order of a recovery treatment if the completion time is invalid.

In accordance with the fourth aspect of the present invention, the ink-jet printer having the above second feature is characterized in that the print control means determines whether or not the completion time of the last printing operation read out from the ink-jet printer is valid and gives an execution order of a recovery treatment if the completion time is invalid.

In accordance with the fifth aspect of the present invention, the ink-jet printer having the above first feature is characterized in that if the completion time which was read from the ink-jet printer at the end of the last printing operation indicates a later time than the current time, the print control means issues to the ink-jet printer a command of prohibiting the update of the completion time held in the storage means.

In accordance with the sixth aspect of the present invention, the ink-jet printer having the above second feature is characterized in that if the completion time which was read from the ink-jet printer at the end of the last printing operation indicates a later time than the current time, the print control means issues to the ink-jet printer a command of prohibiting the update of the completion time held in the storage means.

In accordance with the seventh aspect of the present invention, the ink-jet printer having the above third feature is characterized in that if the completion time which was read from the ink-jet printer at the end of the last printing operation indicates a later time than the current time, the print control means issues to the ink-jet printer a command of prohibiting the update of the completion time held in the storage means.

In accordance with the eighth aspect of the present invention, the ink-jet printer having the above fourth feature is characterized in that if the completion time which was read from the ink-jet printer at the end of the last printing operation indicates a later time than the current time, the print control means issues to the ink-jet printer a command of prohibiting the update of the completion time held in the storage means.

In accordance with the ninth aspect of the present invention, the ink-jet printer having the above first feature is characterized in that if the completion time which was read from the ink-jet printer at the end of the last printing operation indicates a later time than the current time, the print control means informs that fact to other host machines and provides warning.

In accordance with the tenth aspect of the present invention, the ink-jet printer having the above second feature is characterized in that if the completion time which was read from the ink-jet printer at the end of the last printing operation indicates a later time than the current time, the print control means informs that fact to other host machines and provides warning.

In accordance with the eleventh aspect of the present invention, the ink-jet printer having the above third feature is characterized in that if the completion time which was read from the ink-jet printer at the end of the last printing operation indicates a later time than the current time, the print control means informs that fact to other host machines and provides warning.

In accordance with the twelfth aspect of the present invention, the ink-jet printer having the above fourth feature is characterized in that if the completion time which was read from the ink-jet printer at the end of the last printing operation indicates a later time than the current time, the print control means informs that fact to other host machines and provides warning.

In accordance with the thirteenth aspect of the present invention, the ink-jet printer having the above fifth feature is characterized in that if the completion time which was read from the ink-jet printer at the end of the last printing operation indicates a later time than the current time, the print control means informs that fact to other host machines and provides warning.

In accordance with the fourteenth aspect of the present invention, the ink-jet printer having the above sixth feature is characterized in that if the completion time which was read from the ink-jet printer at the end of the last printing operation indicates a later time than the current time, the print control means informs that fact to other host machines and provides warning.

In accordance with the fifteenth aspect of the present invention, the ink-jet printer having the above seventh feature is characterized in that if the completion time which was read from the ink-jet printer at the end of the last printing operation indicates a later time than the current time, the print control means informs that fact to other host machines and provides warning.

In accordance with the sixteenth aspect of the present invention, the ink-jet printer having the above eighth feature is characterized in that if the completion time which was read from the ink-jet printer at the end of the last printing operation indicates a later time than the current time, the print control means informs that fact to other host machines and provides warning.

In accordance with the seventeenth aspect of the present invention, the ink-jet printer having the above second feature further comprises: a clock server for indicating the current time and is characterized in that the print control means reads the current time from the clock server at regular intervals and updates the current time measured by the time measuring means based on the read current time.

In accordance with the eighteenth aspect of the present invention, the ink-jet printer having the above first feature further comprises: a clock server for indicating the current time and is characterized in that, the storage means updates and stores the current time indicated by the clock server at the printing operation end as the completion time of the last printing operation.

In the present invention, the completion time of the last printing operation is updated and stored into the storage means of the ink-jet printer. When a next printing operation is started, the execution order of the recovery treatment is transferred to the ink-jet printer based on comparison between the completion time of the printing operation stored in the storage means and the current time. Therefore, even under the usage conditions where one ink-jet printer is shared by multiple host machines, it is possible for each host machine to exactly grasp the completion time of the previous printing operation in the ink-jet printer, hence it is possible to correctly determine whether or not the recovery treatment in the ink-jet printer should be effected based on the exact inactive time of printing processing computed by comparison between this completion time and the correct time. Accordingly, it is possible to avoid an unnecessary recovery treatment when the inactive time is short and thus the recovery treatment is not required. Therefore, it is possible to avoid waste of the recovery treatment time and ink consumption.

In the present invention, the completion time of the last printing operation is memorized by transferring the completion time from the host machine to the ink-jet printer at the printing end. Therefore it is not necessary for the ink-jet printer to provide means for measuring the current time for the ink-jet printer in order to store the completion time of a printing operation.

Next, in the present invention, when the completion time of the last printing operation being stored in the ink-jet printer is not correct, the execution order of the recovery treatment is issued to the ink-jet printer. Therefore, when the inactive time of printing operation cannot be calculated correctly because the completion time of the previous printing operation being stored in the ink-jet printer is inexact due to data failure, etc., the recovery treatment is effected by assuming that the inactive time of printing operation is long enough to deserve the recovery treatment. Hence no degradation of image quality due to ink ejection failures and nozzle clogging will occur.

In the above configuration, for the print control means to issue an execution order of a recovery treatment when the inactive time, the difference between the completion time and the current time, exceeds a reference value, if the completion time of printing operation read out from the ink-jet printer is invalid, the inactive time may be set at a time equal to or greater than the reference value.

In this configuration, when the completion time of printing operation read out from the ink-jet printer is invalid hence it is impossible to compute an exact value of the inactive time to be used to determine whether an execution of a recovery treatment is needed or not, a recovery treatment execution order is necessarily issued to the ink-jet printer. Therefore, it is possible to positively prevent ink ejection failures and nozzle clogging.

In the present invention, when, for example, the current time indicated by the clock means of a host machine is delayed compared to the correct time, if the completion time to be stored in the storage means is updated by the current time indicated by the clock means of the host machine at the printing operation end, the inactive time of printing operation to be recognized when the ink-jet printer is used by another host machine having a clocking means indicating the correct current time is determined to be longer than the actual time, so that there is a possibility that an unnecessary recovery treatment may be done. To deal with this, if the completion time which was read out from the ink-jet printer at the end of last printing operation is a time later than the current time, the completion time in the storage means will not be updated. Therefore, it is possible to avoid the possibility that the inactive time might be determined to be longer than actual time at a subsequent printing operation, hence avoid unnecessary execution of the recovery treatment.

On the other hand, when the current time indicated by the clock means of a host machine is ahead of the exact current time, if the completion time being stored in the storage means is updated by the current time of the clock means in the host machine at the print operation end, the inactive time of printing operation is determined to be shorter than the actual time when the ink-jet printer is used by another host machine having a clock means indicating the correct current time, hence posing a risk of the necessary recovery treatment being skipped. However, under the condition where the ink-jet printer is shared by multiple host machines, a long term of inactivity of the printer causing ink ejection failure and nozzle clogging will hardly occur. Therefore, even if the inactive time is determined to be more or less shorter, this is unlikely to cause operation failures and degradation of print quality in the ink-jet printer. Thus, even if the ink-jet printer is used continuously, it is possible to avoid unnecessary recovery treatments being done due to inconsistencies of the time indicated by the host machines.

In the present invention, when the time to be stored into the storage means at the end of a current printing operation indicates an earlier time than the completion time of the previous printing operation being stored in the storage means, due to inconsistency of the current time between the individual clocks in the multiple host machines, this situation is informed to all the host machines while warning for recommending the users to check the individual host machines is provided. Thereby, it is possible for the users at the individual host machines to positively recognize that determination as to whether a recovery treatment is needed cannot be made based on the correct current time. Thus, it is possible to let the users make suitable actions such as adjusting the current time.

In the present invention, the current time measured by the time measuring means in each host machine is corrected at regular intervals based on the current time measured by the clock server. Therefore, it is possible to eliminate inconsistency of the current time among the multiple host machines and it is possible for each host machine to cause the ink-jet printer to store the correct current time as the completion time of the last printing operation into its storage means. This makes it possible to make a correct determination as to whether or not a recovery treatment is needed based on the inactive time of printing operation, without being confused by the inconsistency that the completion time read out from the storage means presents a time after the current time in any of the host machines.

Finally, in the present invention, the correct current time measured by the clock server at the time of the printing end is stored as the completion time of printing operation in the storage means. Therefore, the correct completion time of the last printing operation can be always held in the storage means in the ink-jet printer, hence it is possible to make a correct decision as to whether or not a recovery treatment is needed, based on the inactive time of printing operation. Since each host machine does not need to give the current time to the ink-jet printer when the printing operation is terminated, there is no need to monitor or wait the completion of printing after transferring the printing data to the ink-jet printer. Therefore, the control load on the host machine during printing operation can be reduced so that it is possible to improve the processing speed of other processing programs.

DESCRIPTION OF THE PRESENT INVENTION

Figure 1:
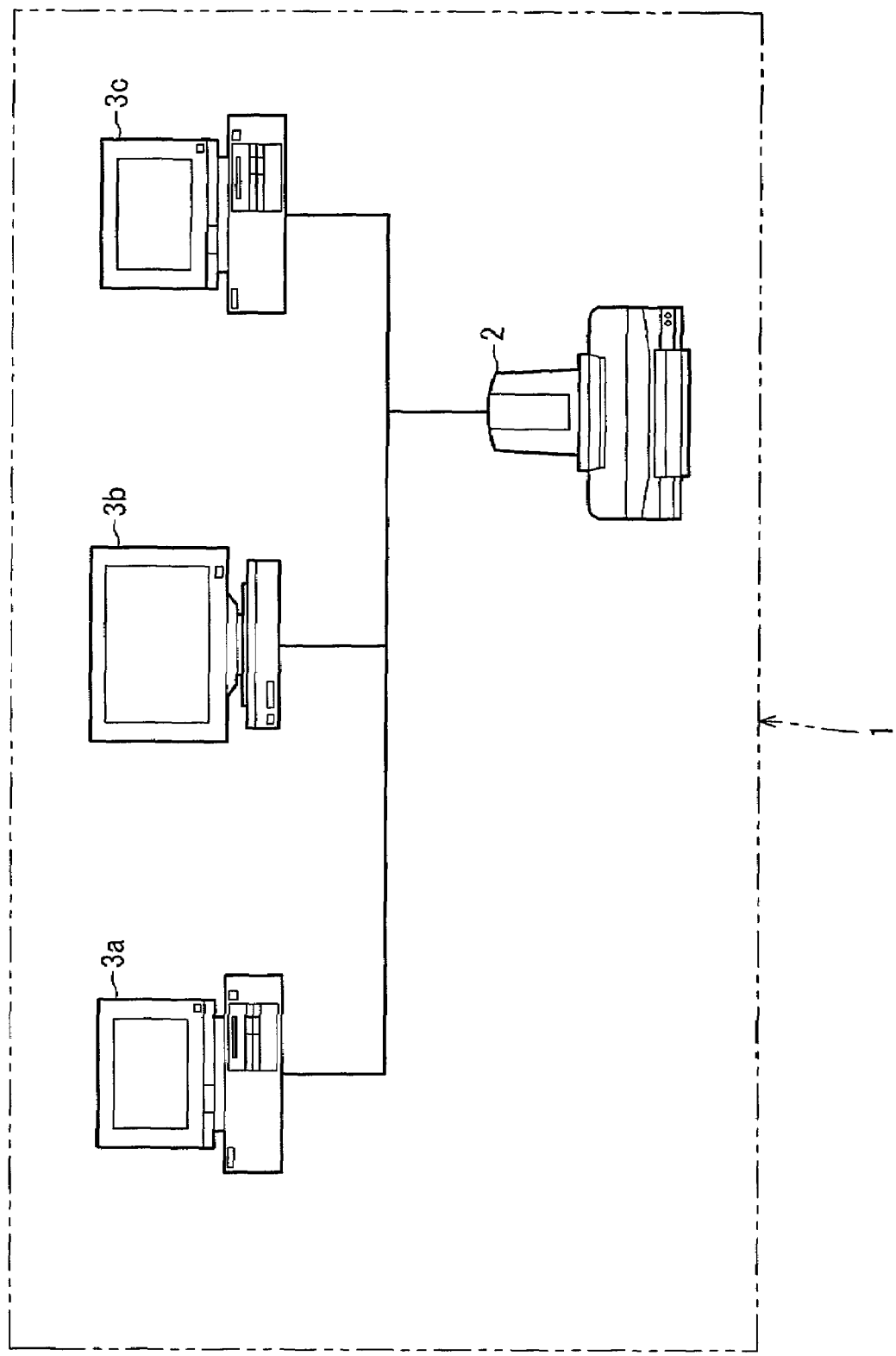
FIG. 1 is a diagram showing a configuration of an ink-jet printer system in accordance with the first embodiment of the present invention.

FIG. 1 is a diagram showing a configuration of an ink-jet printer system in accordance with the first embodiment of this invention. This ink-jet printer system 1 includes a single ink-jet printer 2 and a multiple number of host personal computers (referred to as host PCs hereinbelow) 3a, 3b, - - - as host machines connected on a network. In FIG. 1, three host PCs 3a, 3b and 3c are shown as the multiple host PCs, as an example.

Figure 2:
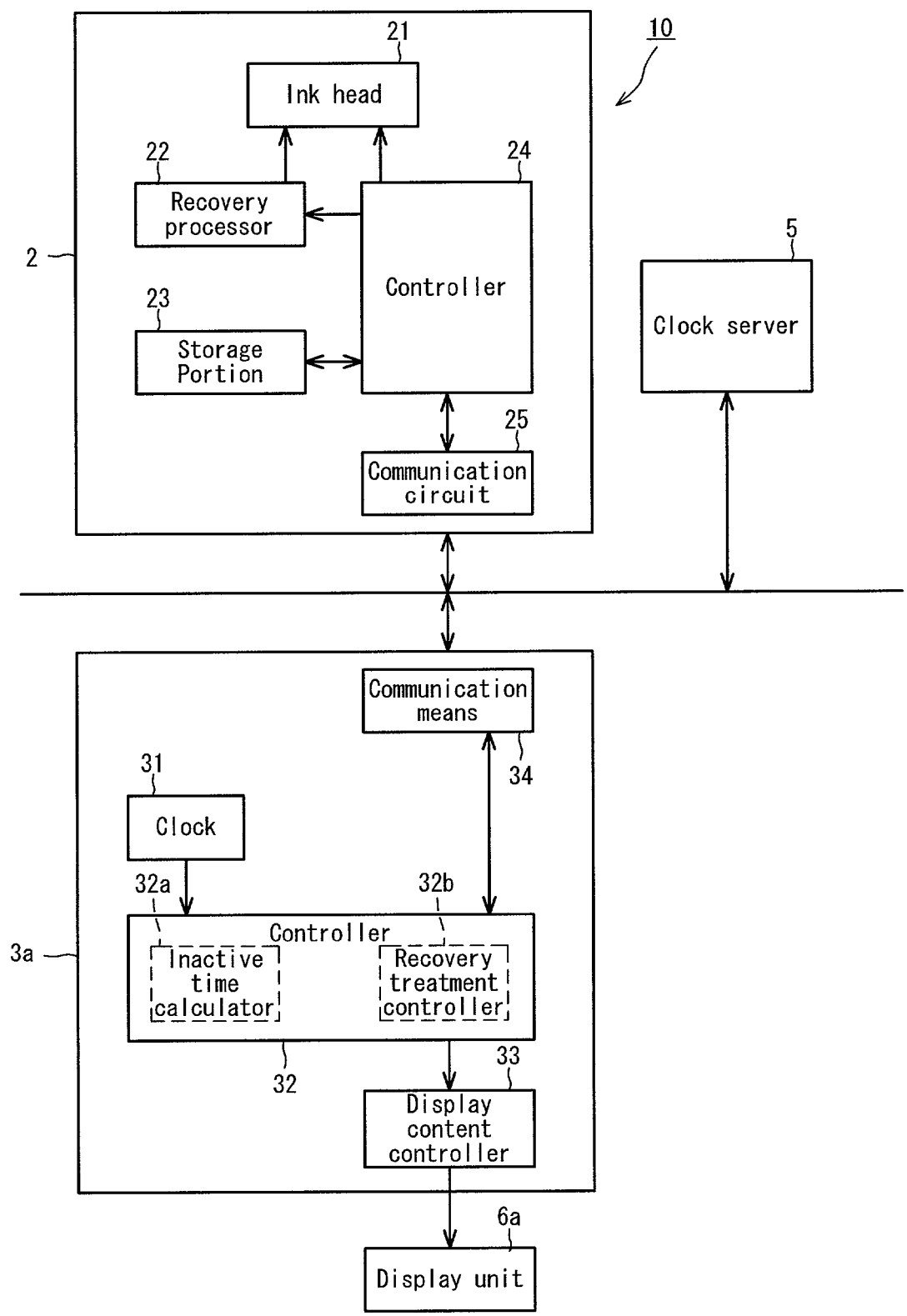
FIG. 2 is a block diagram showing a configuration of an ink-jet printer and host PCs included in the same ink-jet printer system.

FIG. 2 is a block diagram showing a configuration of the ink-jet printer and host PCs included in the above ink-jet printer system. The ink-jet printer 2 is comprised of an ink head 21, a recovery processor 22 for performing a recovery treatment (head cleaning) of this ink head 21, a storage portion (non-volatile memory) 23 for storing the print completion time of the last printing operation, a controller 24 for controlling printing, recovery treatment and the like, a communication circuit 25 for communications with the host PCs 3a to 3c.

The Ink head 21 has nozzles and pressure-producing elements (piezoelectric elements, heat resistors, or the like) and ejects ink from the nozzles by the pressures generated from the pressure producing elements onto a recording medium to print a pictorial image such as characters, symbols etc. During this printing operation, the ink head 21 moves in the main scan direction (in the direction perpendicular to the feed direction of the recording medium) by means of an unillustrated drive motor. This drive motor may also have the function of moving the recording medium in addition to the function of moving the ink head.

The recovery processor 22 is controlled by the controller 24 to effect a necessary recovery treatment of the ink head 21. Determination of the inactive time will be described later. This recovery treatment is a treatment, for example, to clear ink clogging in the nozzles by driving the pressure producing elements over a predetermined period of time with the condition of the ink head 21 being set at the initial position where it does not oppose the recording medium.

The storage portion 23, based on the current time supplied from any of the host PCs 3a to 3c, updates and stores the completion time of a printing operation when the printing operation ends. It should be noted that the storage portion 23 is backed up by an unillustrated power battery separated from the main power supply (not shown) of the ink-jet printer 2 so that it can hold the completion time of the last printing operation if the main power supply is shut down.

The controller 24 governs the data transmission/reception with each of host PCs 3a to 3C by way of communication circuit 25. When controller 24 receives a print request issued from any one of host PCs 3a to 3c, it outputs a printing response including the completion time which has been stored in the storage means and sends to the host PC which issued the print request. The host PC which had issued the print request, transmits print data in response to the printing response from the controller, and controller 24, based on the thus transferred print data, drives ink head 21 to perform the printing operation. If the received printing data includes a recovery treatment command, controller 24 causes recovery processor 22 to effect a necessary recovery treatment.

The host PC 3a is comprised of a clock 31, controller 32, display content controller 33 and a communication circuit 34. The clock 31 is backed up by an unillustrated power battery independent from the main power supply (not shown) of the host PC 3a so that it can indicate the current time if the main power supply is shut down.

The controller 32, based on the processing program stored in an unillustrated storage portion, effects various processes including a printing data creating process and also functions as a print control means of this invention. Therefore, the controller 32 has an inactive time calculator 32a and a recovery treatment controller 32b. This inactive time calculator 32a compares the current time indicated by the clock 31 with the completion time transferred from the ink-jet printer 2, to compute the inactive time of the ink-jet printer 2. The recovery treatment controller 32b, based on the inactive time, determines if a recovery treatment is needed in the ink-jet printer 2. If a recovery treatment was determined to be needed, the controller 32b issues a recovery treatment command to the ink-jet printer 2 by way of the communication circuit 34.

The display content controller 33, based on the display data output from controller 32, drives a display device 61. The communication means 34 is used to establish communications between the ink-jet printer 2 and other host PCs 3b and 3c.

It should be noted that the host PCs 3b and 3c are also configured in the same manner as the host PC 3a.

Figure 3:
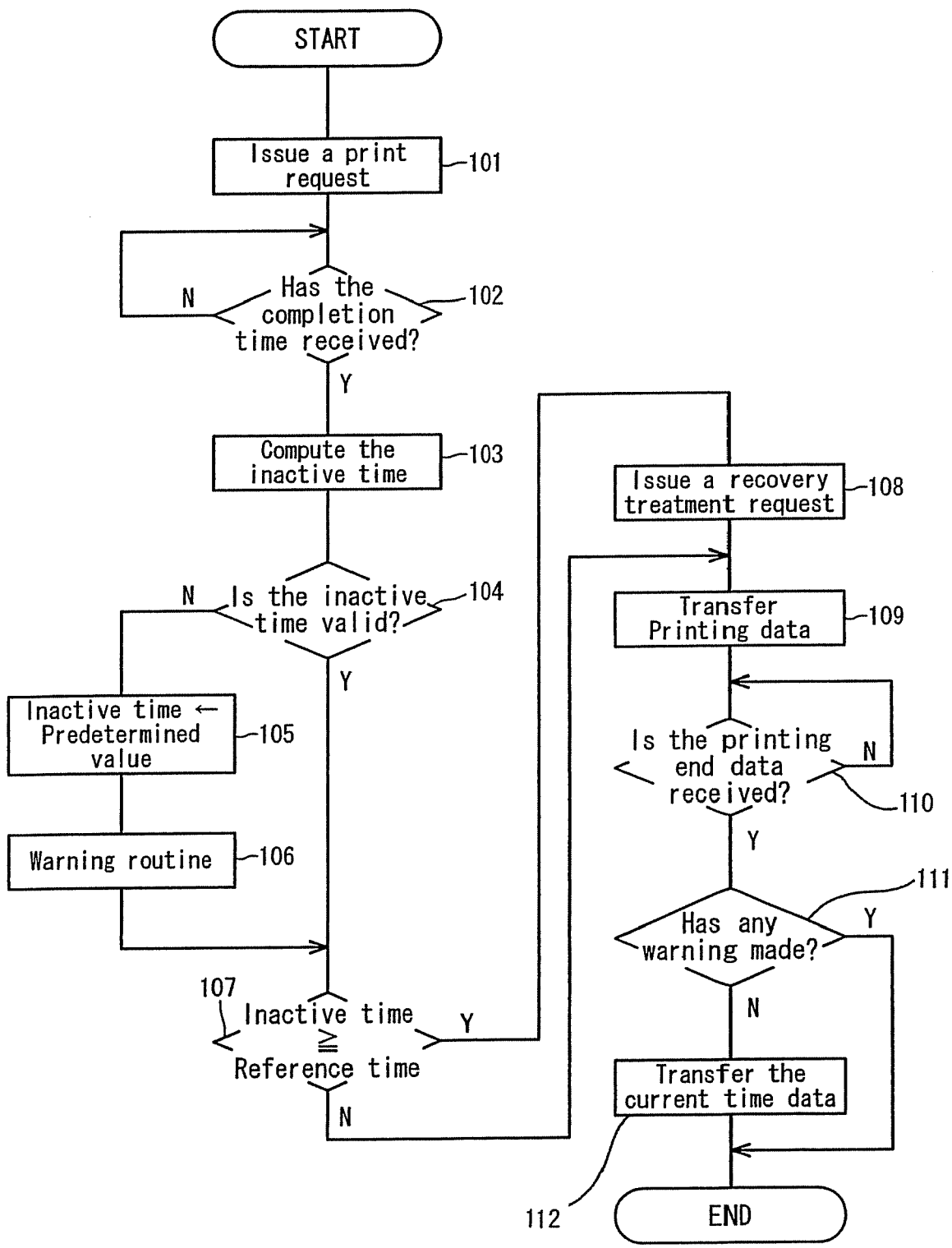
FIG. 3 is a flowchart showing the processing steps at the time of a printing operation by a host PC in the same configuration.

FIG. 3 is a flowchart showing the processing steps during printing by a host PC included in the above ink-jet printer system 1. This flowchart illustrates, as an example, a case where printing data prepared by the host PC 3a is printed using the ink-jet printer 2. When a print job of the printing data created by the host PC 3a is carried out, the controller 32 of the host PC 3a first issues a print request to the ink-jet printer 2(101). The controller 24 of the ink-jet printer 2, in response to this print request, sends the completion time being stored in the storage portion 23 to the host PC 3a. The controller 32, receiving the completion time (102), computes the inactive time of print processing by computing the difference between the completion time and the current time indicated by clock 31 (103) and determines whether or not the calculated inactive time is valid or not (104).

In this case, if the computed inactive time is incorrect as in such a case where the completion time is unknown or where the completion time indicates a time after the current time, the controller 32 sets up a predetermined value equal to or greater than the reference time as the inactive time (105) and effects a warning routine (106). Here, the reference time is the time based on which it is determined whether the recovery treatment in the ink-jet printer 2 is performed. As described later, if the printing operation in the ink-jet printer 2 has not been used over the reference time, it will be determined that a recovery treatment is needed. The warning routine is the procedure for informing the user of the host PC 3a that the current time being stored in the storage portion 23 of the ink-jet printer 2 or that of the clock 31 in the host PC 3a is incorrect. For example, this warning can be provided by displaying such an indication on the display screen of the display device 6a or by making an alarm sound using an unillustrated speaker.

In the above way, when the computed inactive time is invalid, the inactive time is replaced by a predetermined value which is equal to or greater than the reference time. Thus, a recovery treatment will be performed when the inactive time cannot be computed correctly such as when the completion time being stored in the storage portion 23 of the ink-jet printer 2 is incorrect, when the transmission of the completion time could not be made correctly, or when the current time indicated by the clock 31 of the host PC 3a is incorrect. Thereby, in practice it is possible to positively prevent degradation of image quality due to ink clogging by assuming that the printing operation of ink-jet printer 2 has been unused.

Next, the controller 32 determines whether the inactive time is equal to or longer than the reference time (107). If the inactive time is equal to or longer than the reference time, the controller issues a recovery treatment command to the ink-jet printer 2(108). If the inactive time is shorter than the reference time, the printing data is directly transferred to the ink-jet printer 2 (109). The ink-jet printer 2, as it receives the recovery treatment command, causes the recovery processor 22 to start the treatment for removing ink clogging in the nozzles and then starts printing to recording media as it is receiving the printing data.

In this way, when the inactive time is equal to or longer than the reference time, the ink-jet printer 2 performs its recovery treatment, thus enabling itself to print without ink clogging which would have occurred during the time the printing operation was inactive and to maintain beneficial printed conditions in the images on the recording media.

When the printing operation in the ink-jet printer 2 is completed and the print end data is transmitted from the ink-jet printer 2(110), the controller 32, on condition that no warning routine is being effected, transmits the current time data measured by the clock 31 to the ink-jet printer 2(111, 112). The ink-jet printer 2, as it receives the current time data, updates the storage portion 23 and stores the completion time data therein.

In this way, since the completion time of the printing operation is supplied from the host PC 3a to the ink-jet printer 2, it is possible to set the completion time of the last printing operation at the ink-jet printer 2 side based on the clock provided as a general part of a host personal computer, without the necessity of providing an extra clock for ink-jet printer 2.

On the other hand, when the warning routine is effected resulting from the computed inactive time being invalid, the controller 32 ends the operation without transferring the current time data. That is, there is a possibility that any anomaly of the current time measured by the clock 31 of the host PC 3a may cause the inactive time to be invalidated. If an incorrect current time is set as the completion time of the printing operation at the ink-jet printer 2 side, it becomes impossible to correctly compute the inactive time for a subsequent printing operation made by any of the other host PCs 3b and 3c.

Due to inconsistencies of the current time between individual clocks 31 in the host PCs 3a to 3c, there are cases in which the current time which is about to be stored as the completion time into the storage portion 23 indicates a time before the previous completion time which has been stored. In such a case, that is, when the received current time indicates an earlier time than the previous completion time being stored in the storage portion 23, the controller 24 of the ink-jet printer 2 controls so as not to update the storage content in the storage means 23 with the received current time.

Suppose, for example, the current time indicated by the clock 31 of the host PC 3a presents an earlier time. If this earlier current time is stored as the completion time into the storage portion 23, the inactive time will be determined to be longer than its actual time when the printer is used next by another host PC having a correct clock 31 and hence an unnecessary recovery treatment may be performed. In contrast, when the time being stored in the storage portion 23 is not updated as above, no unnecessary recovery treatment will be effected because the inactive time will not be determined to be long.

Conversely, if the current time measured by the clock 31 of the host PC 3a is fast, there is a possibility in the above configuration that a necessary recovery treatment may not be performed. However, if it is considered that the ink-jet printer 2 is shared by multiple host PCs 3a to 3c, a long term of inactivity of the printer will hardly occur. Therefore, the above setting is sufficiently effective and significant to prevent an unnecessary recovery treatment from being effected.

Here, it is possible to configure a system such that, if the current time on the clock 31 indicates a time before the completion time transferred from the ink-jet printer 2, controller 32 of host PC 3a may provide warning at the warning routine (106) or the controller 24 of ink-jet printer 2 may inform other host PCs 3b and 3c after the end of the printing operation so that warning is provided through the display device or speaker of the host PCs 3b and 3c having received the information while upon the printing operation, a predetermined value equal to or greater than the reference time may be set as the inactive time.

By this configuration, the user of any one of the host PCs 3a to 3c included in system 1 is able to know the necessity of readjustment of the clocks of the host PCs 3a to 3c while a necessary recovery treatment can be effected so as to prevent image degradation, by taking into consideration the case where the actual inactive time is equal to or longer than the reference time.

Next, the relationship between the inactive time of the ink-jet printer 2 and the number of ink ejections needed in the recovery treatment will be briefly described.

For a case where the inactive time is relatively short (e.g., within eight hours), the number of ink ejections to be needed is approximately proportional to the inactive time. Therefore, the longer the inactive time, the more the number of ink ejections should be set. In contrast, for a case where the inactive time being short, a fewer number of ink ejections can be set. Such proportional relationship is determined depending on the ink head 21, the physical and chemical characteristics of the ink used, and the ambient usage conditions such as temperature, humidity and the like. On the other hand, for a case where the inactive time is long (e.g., longer than eight hours), the number of ink ejections needed for recovery becomes approximately constant regardless of the duration of the inactive time. This fixed number of ink ejections is the number of ink ejections required to replace the entire ink residing in the channel in the ink head 21 with fresh ink.

If the inactive time has reached a long duration exceeding one month, for example, the ink may be solidified within the channel in ink head 21, so that such an ink head should be restored by a physical method.

Therefore, by taking into account the above relationship, it is possible to configure an ink-jet printer system 1 so that the inactive time can be compared to a multiple number of reference times different to each other to determine the conditions of the recovery treatment (the number of ink ejections, etc.) in accordance with the duration of the inactive time. In this case, if the inactive time is invalid, the inactive time should be set with the greatest value of the multiple reference times while the printing operation should be prohibited until a necessary physical recovery treatment is carried out by the user's manual operation, whereby it is possible to positively prevent image degradation even if the inactive time is unclear.

As has been described, the ink-jet printer system 1 according to this embodiment has the storage portion 23 on the ink-jet printer 2 side so as to update and store the current time on the clock 31 incorporated in each of the host PCs 3a to 3c as the completion time into the storage portion 23. Further, when one of the host PCs 3a to 3c performs a print operation, the host PC reads out the completion time being stored in the storage portion 23 and compares it with the current time to determine the inactive time and command a necessary recovery treatment in accordance with the duration of the inactive time to the ink-jet printer 2.

With this configuration, when a single ink-jet printer 2 is shared by multiple host PCs 3a to 3c, the completion time of the previous printing job is always stored in the ink-jet printer 2. Therefore, based on this completion time, it is possible to exactly determine the inactive time of the ink-jet printer 2. As a result, this configuration is able to avoid unnecessary head cleaning which would have been performed even after a short inactive time and reduce it in number, contributing to its economy.

Further, if the exact inactive time cannot be computed, this ink-jet printer system 1 is adapted to set the inactive time at a predetermined value equal to or greater than the reference time and warn the user. In this way, if the inactive time is unknown, it is possible to perform the treatment by assuming the worst case. Therefore, it is possible to positively prevent operational failures and degradation of print quality.

Even in a case where any of the clocks of the host PCs 3a to 3c holds the wrong time, the system of this embodiment is able to avoid the execution of unnecessary recovery treatment due to wrongly determining the inactive time to be long in spite of its being short, by prohibiting the controller 24 of the ink-jet printer 2 from updating the completion time in the storage portion 23.

Figure 4:
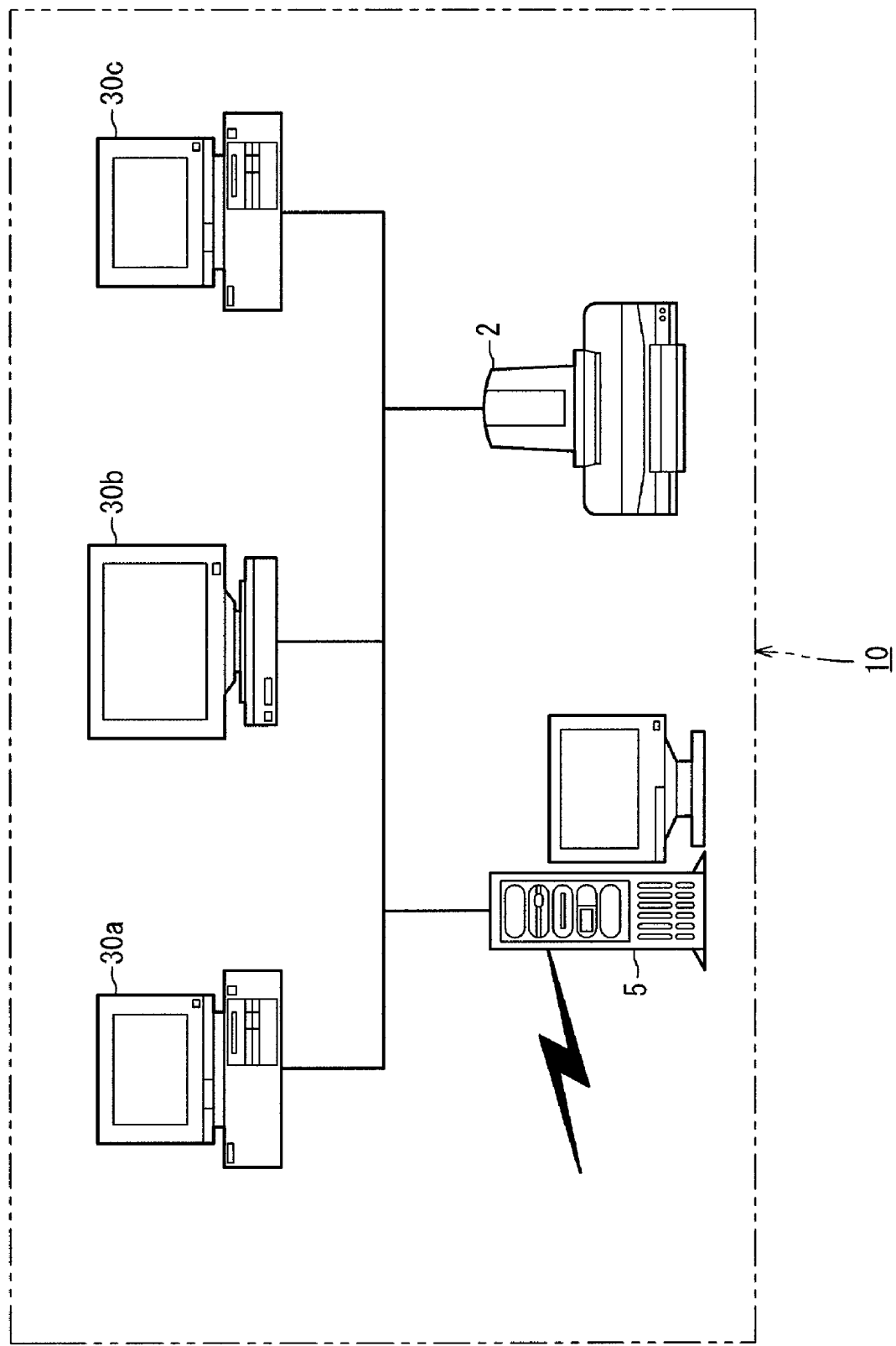
FIG. 4 is a diagram showing a configuration of an ink-jet printer system in accordance with the second embodiment of the present invention.

FIG. 4 is a diagram showing a configuration of an ink-jet printer system in accordance with the second embodiment of the present invention. The ink-jet printer system 10 according to this embodiment is the same as that shown in FIG. 1 except that a clock server 5 is added on the network. This clock server 5 gives the exact current time to correct clocks 31 provided for host PCs 30a to 30c.

Figure 5:
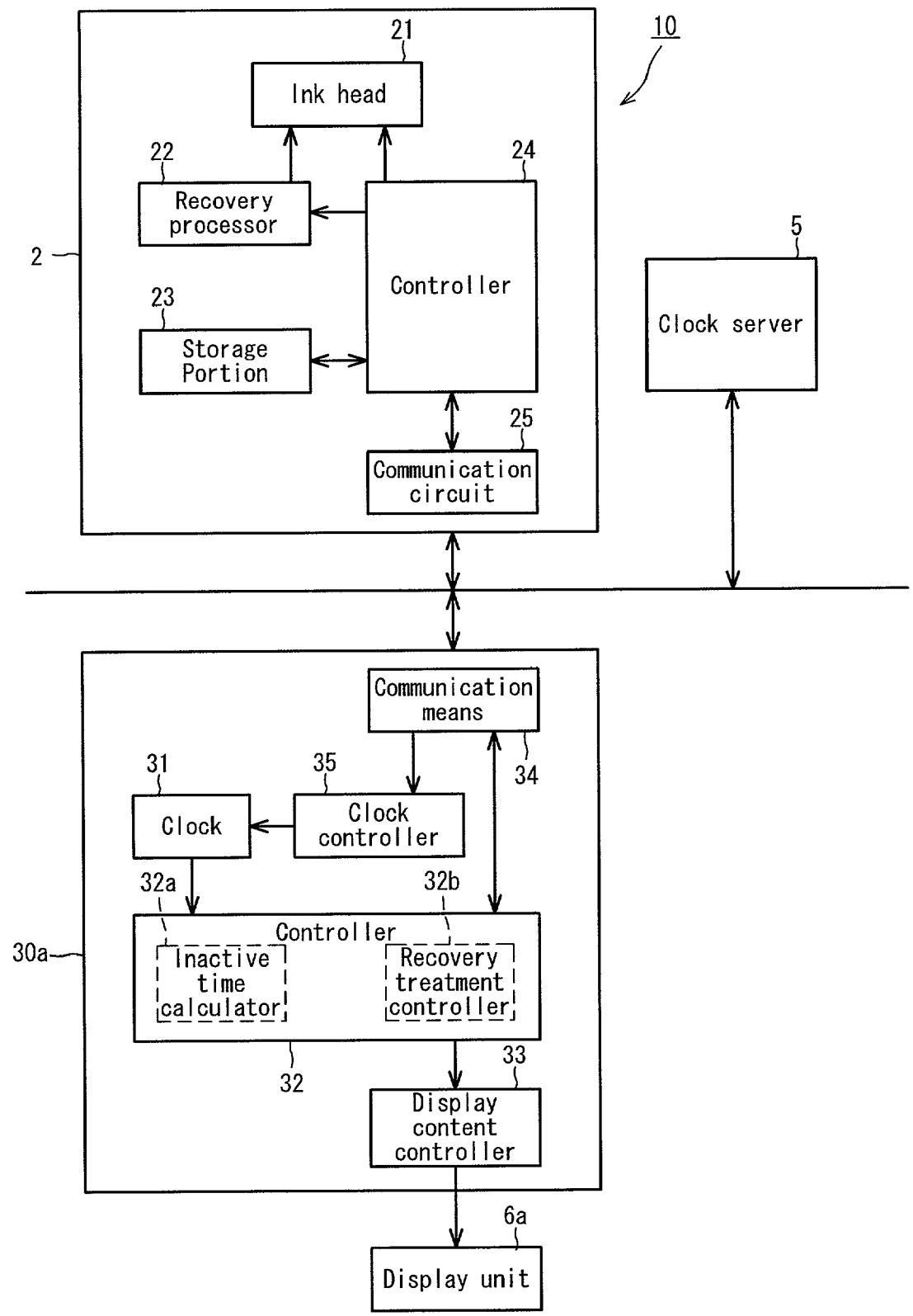
FIG. 5 is a block diagram showing a configuration of an ink-jet printer and host PCs included in the same ink-jet printer system.

FIG. 5 is a block diagram showing a configuration of an ink-jet printer and host PCs included in the ink-jet printer system according to the second embodiment. A host PC 30a has a clock controller 35 added compared to the configuration of host PC 3a shown in FIG. 2. Here, it should be noted that other host PCs 30b and 30c included in system 10 are configured in the same manner as the host PC 30a.

In ink-jet printer system 10 according to this embodiment, the host PC 30a receives a signal of the correct current time from the clock server 5 at regular intervals so that the clock controller 35 corrects the current time measured by the clock 31 to agree with that of the clock server 5. For example, a signal of correct time is issued from the clock server 5 to the clock controller 35 of the host PC 30a every hour, the time on the clock 31 is rewritten by this clock controller 35.

In this configuration, the clocks 31 of all the host PCs 3a to 3c in system 10 are set at correct time with reference to the clock server 5, whereby no inconsistency of the current time on the clocks 31 of the host PCs 30a to 30c will, any longer, occur. Therefore, it is possible to store the correct completion time into the storage portion 23 when a printing operation is completed. This makes it possible for the inactive time calculator 32a in the controller 32 of each host PC 30a to 30c to compute the exact inactive time from the exact completion time and exact current time when a next printing job is started.

When computing the inactive time, there is no risk of the problem whereby the current time being about to be stored into storage portion 23 happens to be before the completion time of the previous printing operation being stored in the storage. Therefore, the inactive time calculator 32a is able to calculate the correct inactive time, so that it is possible to instruct the ink-jet printer 2 to perform the least number of recovery treatments.

In this embodiment, though the current time measured by the clocks 31 of the host PCs 30a to 30c when the printing is completed is stored as the completion time into the storage portion 23 of the ink-jet printer 2, the current time measured by the clock server 5 at the timing of printing end may be transferred to ink-jet printer 2.

In this case, the current time measured by the clock server 5 at the timing of printing end is stored as the completion time in the storage portion 23. Therefore, ink-jet printer 2 is able to hold the correct completion time. When a next printing operation starts, the correct inactive time can be computed by the inactive time calculator 32a. Based on this, the recovery treatment controller 32b makes a correct decision as to recovery treatment so that the controller 24 causes the recovery processor 22 to effect the recovery treatment.

Further, since the host PCs 30a to 30c do not need to write the completion time of printing into the ink-jet printer 2 after transferring the printing data to the ink-jet printer 2, there is no need to monitor the completion of printing. Since there is no need for the host PCs 30a to 30c to continuously run the printing processing program from transfer of the printing data up to the end of the printing process, it is possible to start other processing programs in each of the host PCs 30a to 30c at an earlier stage, thus making it possible to improve the operating efficiencies of the host PCs 30a to 30c.

According to the present invention, the following effects can be obtained.

First, the completion time of the last printing operation is updated and stored into the storage means of the ink-jet printer. When a next printing operation is started, the execution order of the recovery treatment is transferred to the ink-jet printer based on the completion time of the printing operation stored in the storage means and the current time. Therefore, even under the usage conditions where one ink-jet printer is shared by multiple host machines, it is possible for each host machine to exactly grasp the completion time of the previous printing operation in the ink-jet printer, hence it is possible to correctly determine whether or not the recovery treatment in the ink-jet printer should be effected based on the exact inactive time of printing processing computed by comparison between this completion time and the correct time. Accordingly, it is possible to avoid an unnecessary recovery treatment when the inactive time is short and thus the recovery treatment is not required. Therefore, it is possible to avoid waste of the recovery treatment time and ink consumption.

Since the completion time of the last printing operation is memorized by transferring the completion time from the host machine to the ink-jet printer at the printing end, it is not necessary for the ink-jet printer to provide means for measuring the current time for the ink-jet printer in order to store the completion time of a printing operation, thus avoiding increase in cost.

Next, when the completion time of the last printing operation being stored in the ink-jet printer is not correct, the execution order of the recovery treatment is issued to the ink-jet printer. Therefore, when the inactive time of printing operation cannot be calculated correctly because the completion time of the previous printing operation being stored in the ink-jet printer is inexact due to data failure, etc., the recovery treatment is effected by assuming that the inactive time of printing operation is long enough to deserve the recovery treatment, whereby it is possible to positively prevent degradation of image quality due to ink ejection failures and nozzle clogging.

If the completion time read out from the ink-jet printer at the timing of the printing end indicates a time after the current time, the completion time being stored in the storage means is prohibited to be updated, so as to prevent the inactive time of printing operation from being determined to be longer than actual time, thus making it possible to effect an unnecessary recovery treatment.

Next, when the time to be stored into the storage means at the end of a current printing operation indicates an earlier time than the completion time of the previous printing operation being stored in the storage means, due to inconsistency of the current time between the individual clocks in the multiple host machines, this situation is informed to all the host machines while warning for recommending the users to check the individual host machines is provided. Thereby, it is possible for the users at the individual host machines to positively recognize that determination as to whether a recovery treatment is needed cannot be made based on the correct current time. Thus, it is possible to let the users make suitable actions such as adjusting the current time.

The current time measured by the time measuring means in each host machine is corrected at regular intervals based on the current time measured by the clock server, so that it is possible to eliminate inconsistency of the current time among the multiple host machines. Therefore, it is possible for each host machine to cause the ink-jet printer to store the correct current time as the completion time of the last printing operation into its storage means. This makes it possible to make a correct determination as to whether or not a recovery treatment is needed based on the inactive time of printing operation, without being confused by the inconsistency that the completion time read out from the storage means presents a time after the current time in any of the host machines.

Finally, the correct current time measured by the clock server at the time of the printing end is stored as the completion time of printing operation in the storage means, so that the correct completion time of the last printing operation can be always held in the storage means in the ink-jet printer, hence it is possible to make a correct decision as to whether or not a recovery treatment is needed, based on the inactive time of printing operation. Since each host machine does not need to give the current time to the ink-jet printer when the printing operation is terminated, there is no need to monitor the completion of printing after transferring the printing data to the ink-jet printer. Therefore, the control load on the host machine during printing operation can be reduced so that it is possible to improve the processing speed of other processing programs.

What is claimed is:

1. An ink-jet printer system, comprising:
a common ink-jet printer shared by a multiple number of host machines, the ink-jet printer being provided with storage means which stores a completion time instant of a last printing operation conducted based on a print request and print data issued by a host machine, the ink-jet printer providing printing end data to the host machine when the print request requested by the host machine has completed,
wherein, each host machine includes print control means for reading out a previously stored completion time instant from the ink-jet printer at the start of a printing operation, obtaining an inactive time by comparing the read out previously stored completion time instant with the current time, and selectively issuing an execution order of a recovery treatment to the ink-jet printer by comparing the obtained inactive time with a predetermined reference time period, and wherein, the host machine provides the ink-jet printer with current time data, as an updated previously stored completion time instant, when the printing end data is received from the ink-jet printer, such that the updated previously stored completion time instant is acquired by any one of the multiple number of host machines that issues a new print request, and wherein if the completion time instant which was read from the ink-jet printer at the end of the last printing operation indicates a later time than the current time, the print control means informs that fact to other host machines and provides warning.

2. The ink-jet printer system according to claim 1, wherein the print control means includes time measuring means for measuring the current time and transfers the current time measured by the time measuring means at the end of a printing operation to the ink-jet printer as the completion time instant of the printing operation.

3. The ink-jet printer system according to claim 1, wherein the print control means determines whether or not the completion time instant of the last printing operation read out from the ink-jet printer is valid and gives the execution order of the recovery treatment if the completion time instant is invalid.

4. The ink-jet printer system according to claim 2, wherein the print control means determines whether or not the completion time instant of the last printing operation read out from the ink-jet printer is valid and gives the execution order of the recovery treatment if the completion time instant is invalid.

5. The ink-jet printer system according to claim 1, wherein if the completion time instant which was read from the ink-jet printer at the end of the last printing operation indicates a later time than the current time, the print control means issues to the ink-jet printer a command of prohibiting the update of the completion time instant held in the storage means.

6. The ink-jet printer system according to claim 2, wherein if the completion time instant which was read from the ink-jet printer at the end of the last printing operation indicates a later time than the current time, the print control means issues to the ink-jet printer a command of prohibiting the update of the completion time instant held in the storage means.

7. The ink-jet printer system according to claim 3, wherein if the completion time instant which was read from the ink-jet printer at the end of the last printing operation indicates a later time than the current time, the print control means issues to the ink-jet printer a command of prohibiting the update of the completion time instant held in the storage means.

8. The ink-jet printer system according to claim 4, wherein if the completion time instant which was read from the ink-jet printer at the end of the last printing operation indicates a later time than the current time, the print control means issues to the ink-jet printer a command of prohibiting the update of the completion time instant held in the storage means.

9. The ink-jet printer system according to claim 2, further comprising:
a clock server for indicating the current time, wherein the print control means reads the current time from the clock server at regular intervals and updates the current time measured by the time measuring means based on the read current time.

10. The ink-jet printer system according to claim 1, further comprising:
a clock server for indicating the current time, wherein the storage means updates and stores the current time indicated by the clock server at the printing operation end as the completion time instant of the last printing operation.

11. The ink-jet printer system according to claim 1, wherein
when the host machine issues the print request to the ink-jet printer, the ink-jet printer transfers the completion time instant to the host machine before execution of printing.

12. The ink-jet printer system according to claim 1, wherein
the ink-jet printer stores the completion time instant without outputting the updated completion time instant until a next print request is generated by one of the multiple number of host machines is received by the ink-jet printer.

13. The ink-jet printer system according to claim 1, wherein the execution order of the recovery treatment is the treatment wherein amount of ink ejection is made larger as inactive time of printing operation becomes longer while the amount of ink ejection is made smaller as inactive time of printing operation becomes shorter.

* * * * *